United States Patent

[11] 3,581,252

[72] Inventor Franz Sacher
Vienna, Austria
[21] Appl. No. 761,482
[22] Filed Sept. 23, 1968
[45] Patented May 25, 1971
[73] Assignee Wiener Schwachstromwerke Gesellschaft m.b.H.
Vienna, Austria
[32] Priority Feb. 22, 1968
[33] Austria
[31] A1,675/68

[54] POTENTIOMETER CIRCUIT ARRANGEMENT FOR DERIVING A TUNING VOLTAGE
6 Claims, 5 Drawing Figs.

[52] U.S. Cl. .......... 334/15, 323/79, 323/80, 334/47, 338/128, 338/191
[51] Int. Cl. .......... H03j 5/02, H03j 3/18
[50] Field of Search .......... 333/81; 334/15, 47, 49, 88; 323/74, 79, 80, 94, 43.5, 97; 338/128—131, 191

[56] References Cited

UNITED STATES PATENTS

| | | | |
|---|---|---|---|
| 2,255,727 | 9/1941 | Allison .......... | 323/79X |
| 2,724,085 | 11/1955 | Charbonneau .......... | 323/74X |
| 3,205,431 | 9/1965 | Herrick, Jr. .......... | 323/94 |
| 3,233,197 | 2/1966 | Deichen .......... | 334/15 |
| 3,127,582 | 3/1964 | Newhouse et al .......... | 338/129 |

*Primary Examiner*—Herman Karl Saalbach
*Assistant Examiner*—Paul L. Gensler
*Attorney*—McGlew and Toren

ABSTRACT: A circuit arrangement for deriving a tuning voltage for controlling a tuning capacitance includes a plurality of potentiometers connected to form a voltage divider, each having a resistance path and a tap. The tap is electrically connected to the resistance path, and the resistance paths are connected in series. A selector switch comprises a plurality of contacts, each connected to a respective one of the taps, and a contact arm selectively engageable with the contacts. Each potentiometer corresponds to a respective frequency range, such as a channel or a group of channels.

INVENTOR.
FRANZ SACHER
BY
McGlew & Toren
ATTORNEYS

INVENTOR.
FRANZ SACHER

BY

McGlew & Toren
ATTORNEYS

INVENTOR.
FRANZ SACHER
BY
McGlew & Toren
ATTORNEYS

POTENTIOMETER CIRCUIT ARRANGEMENT FOR DERIVING A TUNING VOLTAGE

SUMMARY OF THE INVENTION

This invention relates to circuit tuners and, more particularly, to a novel potentiometer circuit arrangement for tuners including voltage-dependent capacitors and which is particularly suitable for use with tuners for television receivers.

The potentiometer circuit arrangement of the invention has the advantage that the tuning of all channels which are receivable at a given location can be preset and stored. The arrangement is structurally simple and is proved particularly useful at locations where more than eight transmitters can be received.

In accordance with the invention, the tuning circuit arrangement includes a respective potentiometer for each frequency range (channel or channel group), and provides for deriving the tuning voltage from the taps of the potentiometers. The potentiometers have resistance paths which have resistance values which, in relation to the total resistance value of all the potentiometers, are proportional to the ranges of the tuning voltages associated with the respective frequency ranges relative to the total range of the tuning voltage. These resistance paths are connected in series in a sequence which corresponds to the frequency ranges associated with them. The taps of the potentiometers are connected to the contacts of a selector switch having a contact arm engageable with the contacts to select the frequency ranges.

The widths and relations of the frequency ranges, and the voltage-capacitance characteristic of the voltage-dependent capacitor, will determine the widths and the relations of the ranges of the tuning voltages. The selector switch may also be used for all other switching steps required for setting the frequency band, if additional contacts are provided at the selector switch for this purpose.

In accordance with another feature of the invention, the selector switch is provided with an adjusting device which is adapted to be coupled to the potentiometer tap of the adjusted or selected frequency band, and is preferably provided with a speed reducing mechanical transmission.

An object of the invention is to provide an improved potentiometer circuit arrangement for deriving a tuning voltage.

Another object of the invention is to provide such a circuit arrangement which includes a plurality of potentiometers connected to form a voltage divider.

A further object of the invention is to provide such a circuit arrangement in which each of the potentiometers has a resistance path and a tap, the tap being electrically connected to the resistance path.

Still another object of the invention is to provide such a circuit arrangement in which the resistance paths are connected in series.

A further object of the invention is to provide such a circuit arrangement including a selector switch having a plurality of contacts each connected to a respective one of the taps, and further including a contact arm selectively engageable with the contacts.

Yet another object of the invention is to provide such a circuit arrangement in which the selector switch may also be used for all other switching steps required for setting the frequency band.

A further object of the invention is to provide such a circuit arrangement in which the selector switch is adapted to be coupled to the potentiometer tap of the adjusted frequency band.

Another object of the invention is to provide such a circuit arrangement in which the selector switch is provided with a speed reducing mechanical transmission.

For an understanding of the principles of the invention, reference is made to the following description of a typical embodiment thereof as illustrated in the accompanying drawings.

DETAILED DESCRIPTION OF THE PREFERRED EMBODIMENT

Figure 1:
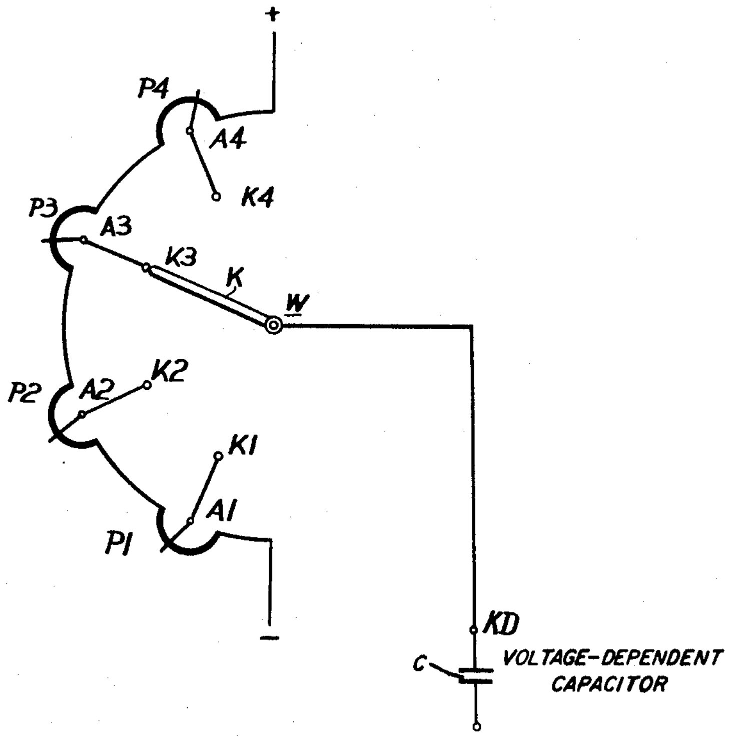
FIG. 1 is a basic schematic wiring diagram of a potentiometer circuit arrangement embodying the invention.

Referring to FIG. 1, the resistance paths of four potentiometers P1—P4 are connected, in series with each other, between the positive and negative terminals of an auxiliary source of DC potential. The resistance paths of the four potentiometers thus form the component resistors of a voltage divider. The taps A1—A4 of the respective potentiometers are connected to respective contacts K1—K4 of a selector switch *W*. The voltage divider can be adjusted to a certain voltage range with the aid of a movable contact arm *K* of selector switch *W*.

Within the adjusted voltage range, a fine adjustment can be effected with the aid of the respective tap A1—A4 of the selected potentiometer P1—P4.

The potentiometer circuit illustrated in FIG. 1 is thus a voltage divider which can be used for both a coarse and fine adjustment of the voltage which can be derived. The voltage ranges which are covered by the several potentiometers directly adjoin each other. A distance between adjacent voltage ranges, within which a fine adjustment is possible, may be provided for by a connection of properly dimensioned resistors between the various potentiometers. For instance, in voltage-dependent capacitors having a substantially logarithmic voltage-capacitance characteristic, the logarithm of the tuning voltage will be approximately proportional to the square of the frequency.

The potentiometer circuit shown in FIG. 1 can be used in the same manner as a simple potentiometer for the adjustment of a voltage-dependent capacitor in the tuner of a television receiver, if the contact arm *K* of the selector switch *W*, rather than the potentiometer tap of the simple potentiometer, is connected at KD to a voltage-dependent capacitor *c*.

Figure 2:
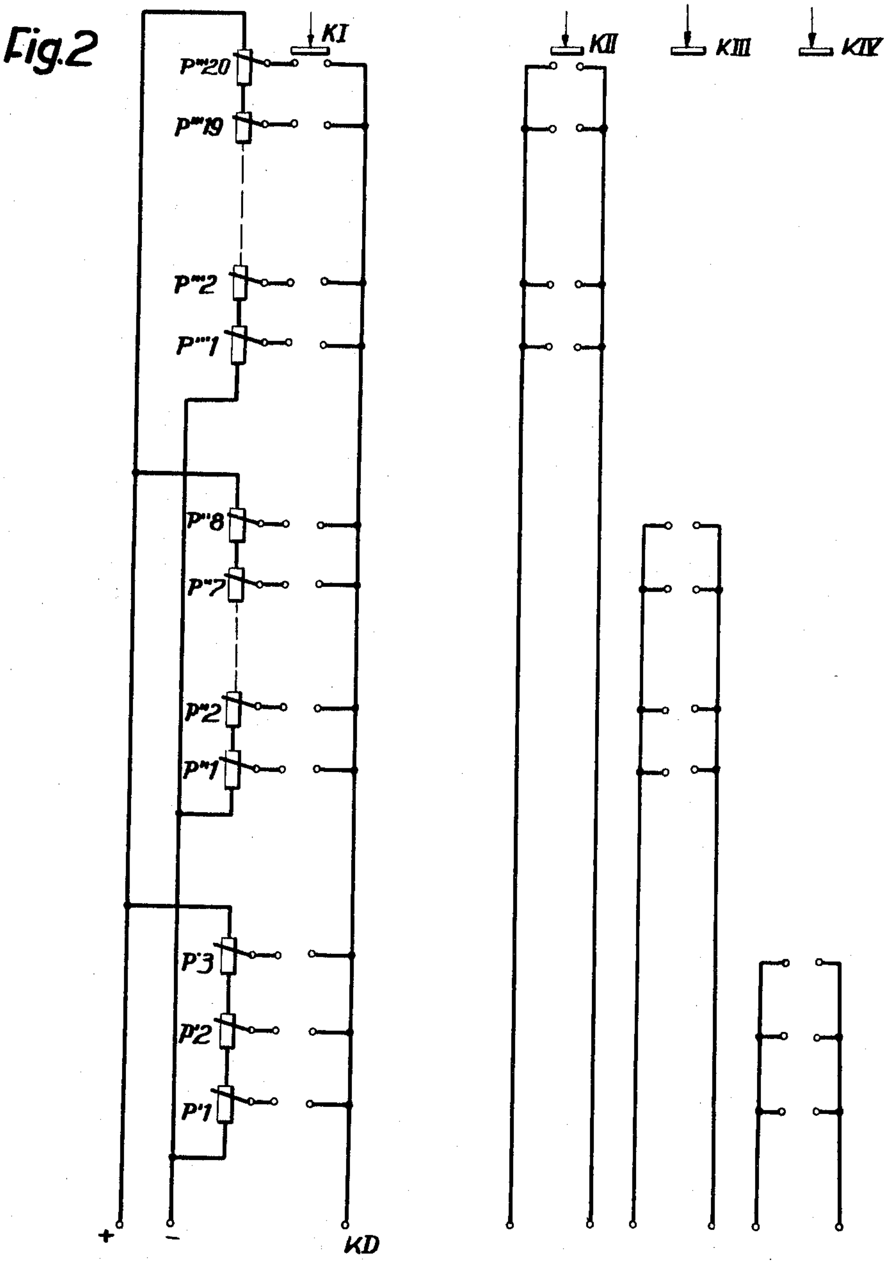
FIG. 2 is a schematic diagram of a tuning system, embodying the invention, for a plurality of tuning ranges.

Referring now to FIG. 2, a tuning circuit is illustrated which includes three frequency bands. The first band comprises three frequency ranges, which are adjustable with the aid of the potentiometers P′1, P′2 and P′3. The second frequency band comprises eight frequency ranges, which are adjustable by the potentiometers P″1—P″8. The potentiometers of a third frequency range, having 20 frequency ranges, are illustrated as P‴1—P‴20. For greater clarity, the potentiometers and the contact paths are illustrated in FIG. 2 in a straight-line array, rather than a circular array. The selector switch has a plurality of contact arms or elements KI, KII, KIII and KIV.

Contact element or arm KI connects the tap of the adjusted potentiometer to the terminal KD, which is connected to the voltage-dependent capacitor. Additional contacts must be actuated when an adjustment of the various frequency ranges is desired. These contacts are shown, but not numbered, in FIG. 2, and are operatively associated with the contact elements or arms KII, KIII and KIV, which are adjusted in unison with the contact element or arm KI.

Figure 3:
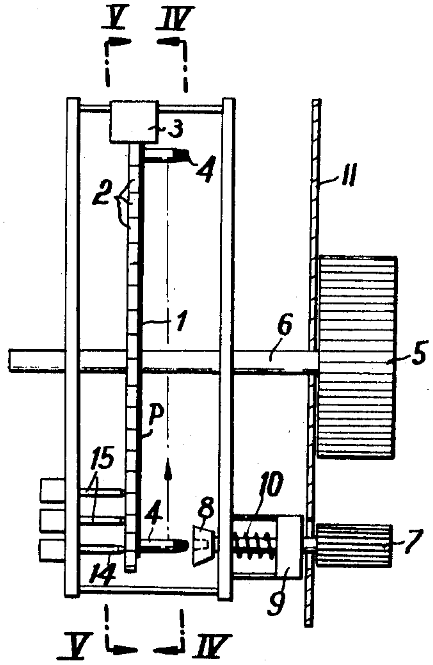
FIG. 3 is a longitudinal sectional view of a tuning arrangement embodying the invention.
Figure 4:
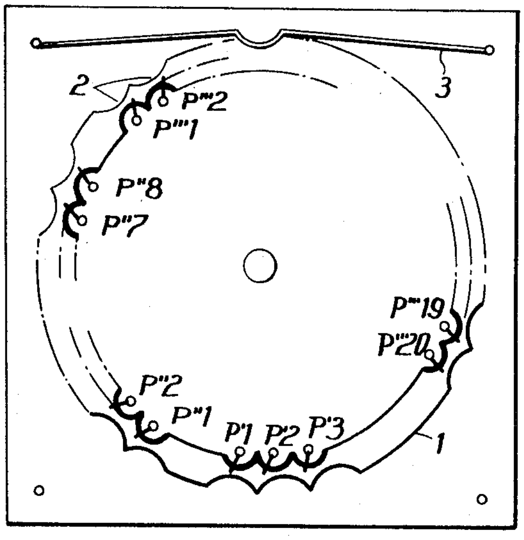
FIG. 4 is a transverse sectional view taken on the line IV–IV of FIG. 3.
Figure 5:
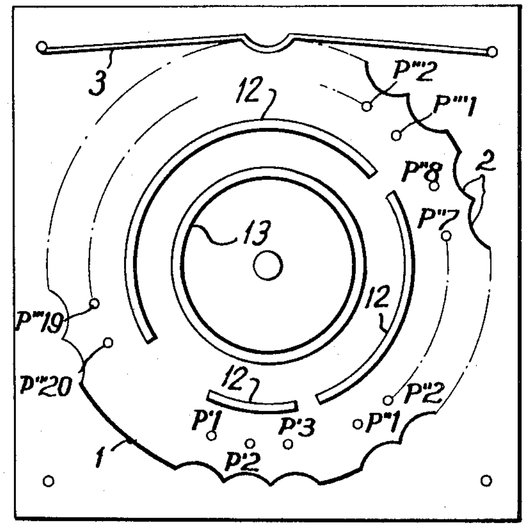
FIG. 5 is a transverse sectional view taken on the line V–V of FIG. 3.

In the turning device shown in FIGS. 3, 4 and 5, all the potentiometers are mounted on a rotatable disc 1, preferably of dielectric material, which has its periphery formed with detent notches. 2. These detent notches 2 cooperate with s spring 3 for releasable holding of the disc 1 when the latter has been set to a given frequency range. The potentiometers on disc 1 are designated in accordance with their arrangement within the circuit shown in FIG. 2. Because the individual potentiometers cannot be clearly distinguished in FIG. 3, their resistance paths are all designated *P*.

Each potentiometer is provided with an adjusting shaft 4, the adjusting shafts being shown, in FIG. 3, only for the lowermost and uppermost potentiometers. A rotary know 5 is connected to disc 1 by a shaft 6 and serves to angularly adjust disc 1 so as to select a desired frequency range.

Another rotary knob 7 is part of an adjusting device for the potentiometer for the selected frequency range. This adjusting device comprises a cap 8 which has a conical recess and is displaceable axially toward the conical end portion of the adjusting pin 4 of that potentiometer which is axially aligned with the adjusting device. Thereby, cap 8 can be engaged with the adjusting shaft 4 and, by a rotation of knob 7, the adjusting shaft 4 of the potentiometer can be adjusted to effect a tuning to the desired frequency. Pressure is applied to rotary knob 7 to engage cap 8 with adjusting shaft 4. Cap 8 can be turned with the aid of rotary knob 7. A gear reducer 9 is connected between the shaft of rotary knob 7 and the shaft of cap 8, and provides for a fine adjustment of the potentiometer. A restoring spring 10 serves to bias cap 8 and knob 7 out of operative relation with shaft 4. The adjusted frequency range can be read from the scale which is applied to the housing wall 11 of the television receiver.

FIG. 4, which is a sectional view taken on the line IV–IV of FIG. 3, shows the invention tuning device in such a manner that the potentiometers P1...P'''20 are fully visible on the front face of disc 1. The rear face of disc 1 is shown in FIG. 5, in an elevation taken on the line V–V of FIG. 3. This rear face is provided with a printed circuit comprising contact strips 12, which lead to the potentiometer taps, and one or more continuous contact strips 13, which are additionally required for a selection of the frequency band, as is indicated in FIG. 2. These contact strips 12 and 13 cooperate with respective contacts 14 and 15, shown in FIG. 3.

I claim:

1. A potentiometer circuit arrangement, for deriving a tuning voltage for controlling a tuning capacitance such circuit arrangement comprising, in combination, a plurality of potentiometers each including a resistance path and a respective tap electrically connected to the associated resistance path; said resistance paths being connected in series between two terminals of a source of potential to form a voltage divider; each potentiometer corresponding to a respective frequency range having a respective tuning voltage range corresponding thereto; the respective resistance values of said resistance paths, in relation to the sum of the resistance values of all said resistance paths, being proportional to the respective tuning voltage ranges corresponding to the respective frequency ranges in relation to the sum of all said tuning voltage ranges; a selector switch having a plurality of contacts each connected to a respective one of said taps, and a movable contact arm engageable with said contacts; and a voltage-dependent tuning capacitance connected to said selector switch.

2. A potentiometer circuit arrangement, as claimed in claim 1, in which each of said frequency ranges comprises a frequency channel.

3. A potentiometer circuit arrangement, as claimed in claim 1, in which each of said frequency ranges comprises a group of frequency channels.

4. A potentiometer circuit arrangement, as claimed in claim 1, in which said selector switch includes additional contact means for frequency band selection.

5. A potentiometer circuit arrangement, as claimed in claim 1, including an adjusting device operatively associated with said selector switch to adjust the tap of a selected potentiometer to a resistance value corresponding to a selected frequency; and means operable to couple said adjusting device mechanically to the tap connected to the contact then engaged by the movable contact arm of said selector switch.

6. A potentiometer circuit arrangement, as claimed in claim 5, in which said adjusting device includes a speed reducing mechanical transmission.